(12) United States Patent
Enyedy et al.

(10) Patent No.: US 9,193,004 B2
(45) Date of Patent: Nov. 24, 2015

(54) VOLTAGE SENSING FOR HOT WIRE GUNS

(71) Applicants: Edward A. Enyedy, Eastlake, OH (US); Steven R. Peters, Huntsburg, OH (US)

(72) Inventors: Edward A. Enyedy, Eastlake, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 437 days.

(21) Appl. No.: 13/776,006

(22) Filed: Feb. 25, 2013

(65) Prior Publication Data

US 2014/0131321 A1 May 15, 2014

Related U.S. Application Data

(60) Provisional application No. 61/725,677, filed on Nov. 13, 2012.

(51) Int. Cl.
*B23K 9/095* (2006.01)
*B23K 9/10* (2006.01)

(52) U.S. Cl.
CPC .............. *B23K 9/1093* (2013.01); *B23K 9/095* (2013.01)

(58) Field of Classification Search
CPC ................................ B23K 9/095; B23K 9/093
See application file for complete search history.

(56) References Cited

U.S. PATENT DOCUMENTS

| 6,066,832 | A | * | 5/2000 | Uecker et al. | 219/136 |
| 6,127,651 | A | * | 10/2000 | Burgoon et al. | 219/137 R |
| 2002/0117489 | A1 | * | 8/2002 | Arndt et al. | 219/130.5 |
| 2002/0158048 | A1 | * | 10/2002 | Stricklen | 219/75 |
| 2008/0290072 | A1 | * | 11/2008 | Serio | 219/74 |
| 2010/0176109 | A1 | * | 7/2010 | Peters | 219/137.61 |

FOREIGN PATENT DOCUMENTS

JP 03-013271 A * 1/1991
JP 05-253671 A * 10/1993

OTHER PUBLICATIONS

Machine translation of Japan Patent No. 5-253,671, Apr. 2015.*

* cited by examiner

*Primary Examiner* — Geoffrey S Evans
(74) *Attorney, Agent, or Firm* — Hahn, Loeser & Parks, LLP (57) ABSTRACT

The invention described herein generally pertains to a system and method for a voltage sense lead being disposed on or within a welder gun in a hot wire application (e.g., hot wire laser, hot wire hybrid, and the like) to monitor voltage across the electrode. In this manner, resistive heating can be regulated to ensure that the wire and weld pool (e.g., puddle) temperature are within a desired range. The voltage sense lead can be incorporated into a welder gun or onto a welder gun in order to mitigate inaccuracies and voltage drops resultant of a cable connecting the welder gun to the wire feeder of a hot wire system.

13 Claims, 7 Drawing Sheets

VOLTAGE SENSING FOR HOT WIRE GUNS

CROSS-REFERENCE TO RELATED APPLICATIONS

This application claims the benefit of priority to U.S. Provisional Application Ser. No. 61/725,677, filed Nov. 13, 2012, and entitled "VOLTAGE SENSING FOR HOT WIRE GUNS." The entirety of the aforementioned application is incorporated herein by reference.

TECHNICAL FIELD

The invention described herein pertains generally to a system and method that detects voltage for a hot wire welding process.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, laser, among others). The hot wire welding process includes the resistance heating of the up to or near a melting point of such wire. In hot wire welding processes, the formation of an arc is avoided since an arc condition disrupts or overheats the puddle. Yet, a wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted. For instance, voltage is a welding parameter that is normally detected from a conductor block within a wire feeder taken with respect to some point within the work lead or workpiece. Measurement of the welding parameter at the conductor block may include inaccuracies and false readings due to voltage drops across the welder gun and the cable connecting the welder gun to the wire feeder and/or conductor block. This cable and welder gun generate a voltage drop (e.g., up to 1.5 volts in extreme conditions) and other inaccuracies which affect the hot wire welding process in light of having a low voltage operation range (e.g., 7 volts to 8 volts).

As mentioned, a hot wire welding process can be compromised by a voltage drop caused by a cable connection and what is needed is an improved technique to detect voltage in a hot wire welding environment.

SUMMARY OF THE INVENTION

In accordance with the present invention, there is provided a welder system for detecting voltage comprising the steps of: a welder gun used for a hot wire welding process; a wire power supply that heats an electrode fed into the welder gun while avoiding a formation of an arc; a power supply that creates a puddle in which the puddle receives the electrode via the welder gun; a cable that connects the welder gun to a conductor block of the welder system; and a voltage sense lead located at least one of on the welder gun or within the welder gun, wherein the voltage sense lead is placed such that it picks up a more accurate reading of the actual hot wire voltage drop thus bypassing any voltage drop associated with the cable.

In accordance with the present invention, there is provided a welder system that comprises: a welder gun used for a hot wire welding process; a wire power supply that heats an electrode fed into the welder gun while avoiding a formation of an arc; a primary heat source consisting of a power supply that creates a puddle in which the puddle receives the electrode via the welder gun; a cable that connects the welder gun to a conductor block of the welder system, wherein the cable includes a gas line, a portion of copper surrounding the gas line, and an outer jacket surrounding the portion of copper; and a voltage sense lead that is located within the jacket of the cable, wherein the voltage sense lead is insulated from the portion of copper within the cable and connects to the welder gun.

In accordance with the present invention, there is provided welder system that comprises: means for supplying current to an electrode for a hot wire welding process that avoids a formation of an arc; means for creating a puddle on a workpiece which receives the electrode; means for monitoring a voltage related to the electrode from a voltage sense lead located on a contact tip of a welder gun, wherein the voltage is independent of a voltage drop due to a cable connecting the welder gun and a conductor block; means for controlling at least one of the means for supplying based on the voltage or the means for creating based on the voltage.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to a voltage sense lead being disposed on or within a welder gun in a hot wire application (e.g., hot wire laser, hot wire hybrid, and the like) to monitor voltage across the electrode. In this manner, resistive heating can be regulated to ensure that the wire and weld pool (e.g., puddle) temperature are within a desired range. The voltage sense lead can be incorporated into a welder gun or onto a welder gun in order to mitigate inaccuracies and voltage drops resultant of a cable connecting the welder gun to the wire feeder of a hot wire system. In an embodiment, the voltage sense lead can be disposed on a contact tip of the welder gun in which to provide a voltage reading without voltage drop from a welder gun cable. Based upon the voltage reading provided by the voltage sense lead, the hot wire welding process is controlled to regulate temperatures of the wire (e.g., electrode) and/or the puddle (e.g., weld pool).

Figure 1:
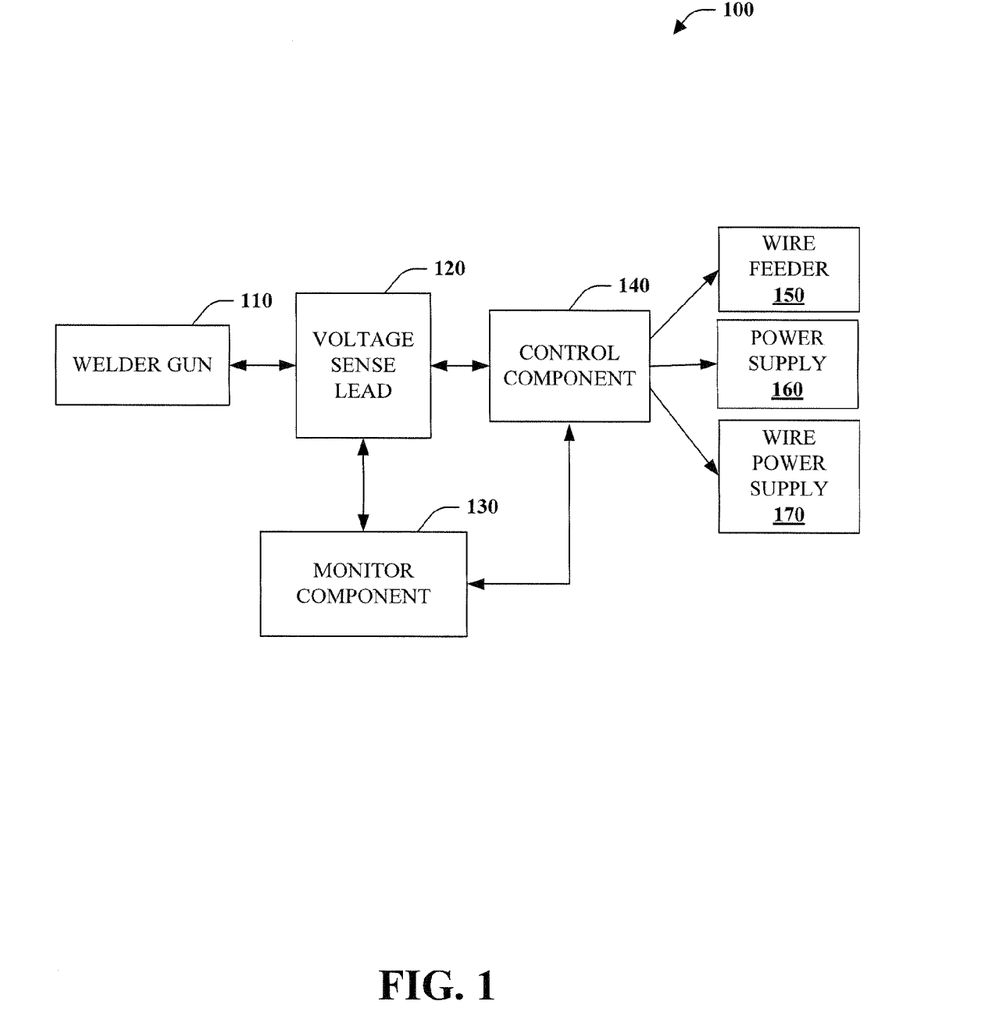
FIG. 1 is a block diagram illustrating a welder system that facilitates monitoring voltage with a voltage sense lead included within or on a welder gun used in a hot wire welding process.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates welder system 100 that facilitates monitoring voltage with a voltage sense lead included within or on a welder gun used in a hot wire welding process. System 100 includes welder gun 110 that is used in a hot wire welding process or application. As referenced above, hot wire welding processes or applications avoid an arc condition to facilitate a weld puddle receiving the wire. Welder gun 110 is used in the hot wire process to deliver wire to a workpiece. Welder gun 110 includes voltage sense lead 120 that allows voltage detection related to the wire and the hot wire welding process. It is to be appreciated and understood that the voltage sense lead 120 can be connected to welder gun 110 (as depicted), incorporated into welder gun 110, or a combination thereof.

Voltage sense lead 120 is incorporated into welder gun 110 or electrically connected to welder gun 110 which eliminates a voltage drop or inaccuracy from a cable (not shown but referenced in FIG. 5) connecting welder gun 110 to a wire feeder. Conventional hot wire systems employ a cable connection between a welder gun and a wire feeder, wherein a voltage reading is taken from a conductor block in the wire feeder. Such conventional techniques are inaccurate and provide false readings based on the cable connection.

System 100 further includes monitor component 130 that tracks a voltage reading or level from voltage sense lead 120 to identify a voltage for the electrode (e.g., wire) on the workpiece. Monitor component 130 is configured to detect a real-time voltage of the electrode or wire via voltage sense lead 120, wherein the real-time voltage provides more accurate readings based on elimination of interference from a cable as well as closer proximity to the electrode and workpiece. In an embodiment, voltage sense lead 120 is on welder gun 110 and/or included within welder gun 110. Monitor component 130 can employ a predetermined or dynamically determined threshold range, wherein a value outside the threshold range can initiate an adjustment to the hot wire welding process. It is to be appreciated that the threshold range can be dynamically identified with feedback or feed-forward loops, can be predefined, or a combination thereof. Moreover, the threshold range can include a tolerance or percentage of deviation.

The detected voltage via voltage sense lead 120 is utilized by control component 140. System 100 includes control component 140 that is configured to adjust a welding parameter of the hot wire welding process based on the voltage level detected via monitor component 130 and voltage sense lead 120. Control component 140 includes at least one of control wire feeder 150, power supply 160, or wire power supply 170. For instance, wire feeder 150 is configured to regulate a wire feed speed and/or wire feed direction. Power supply 160, for instance, supplies power to a heating source that creates a weld pool (e.g., puddle) on a workpiece. As an example, wire power supply 170 supplies current to heat a wire (e.g., electrode) to minimize disturbance of the weld pool upon receipt of the wire.

Control component 140 can adjust a welding parameter based upon the detected reading of voltage for the hot wire process. In an embodiment, control component 140 adjusts a wire feed speed based on a detected voltage not within a threshold range. For example, a voltage below the threshold range can trigger a decrease in wire feed speed. In another example, a voltage above the threshold range can initiate an increase in wire feed speed. In another embodiment, control component 140 adjusts a wire feed direction. For instance, a voltage can be below the threshold range in which a wire feed direction can be reversed to remove wire from the workpiece. In another embodiment, power supply 160 is managed by control component 140 based on the voltage level detected via voltage sense lead 120. For instance, a power supply can be increased if the voltage detected is below the threshold range. In another example, the power supply can be decreased if the voltage detected is above the threshold range. In yet another embodiment, control component 140 controls wire power supply 170 based upon detected voltage readings from voltage sense lead 120. For example, if the voltage is below the threshold range, the wire power supply can be increased. In another example, if the voltage is above the threshold range, the wire power supply can be decreased.

Figure 8:
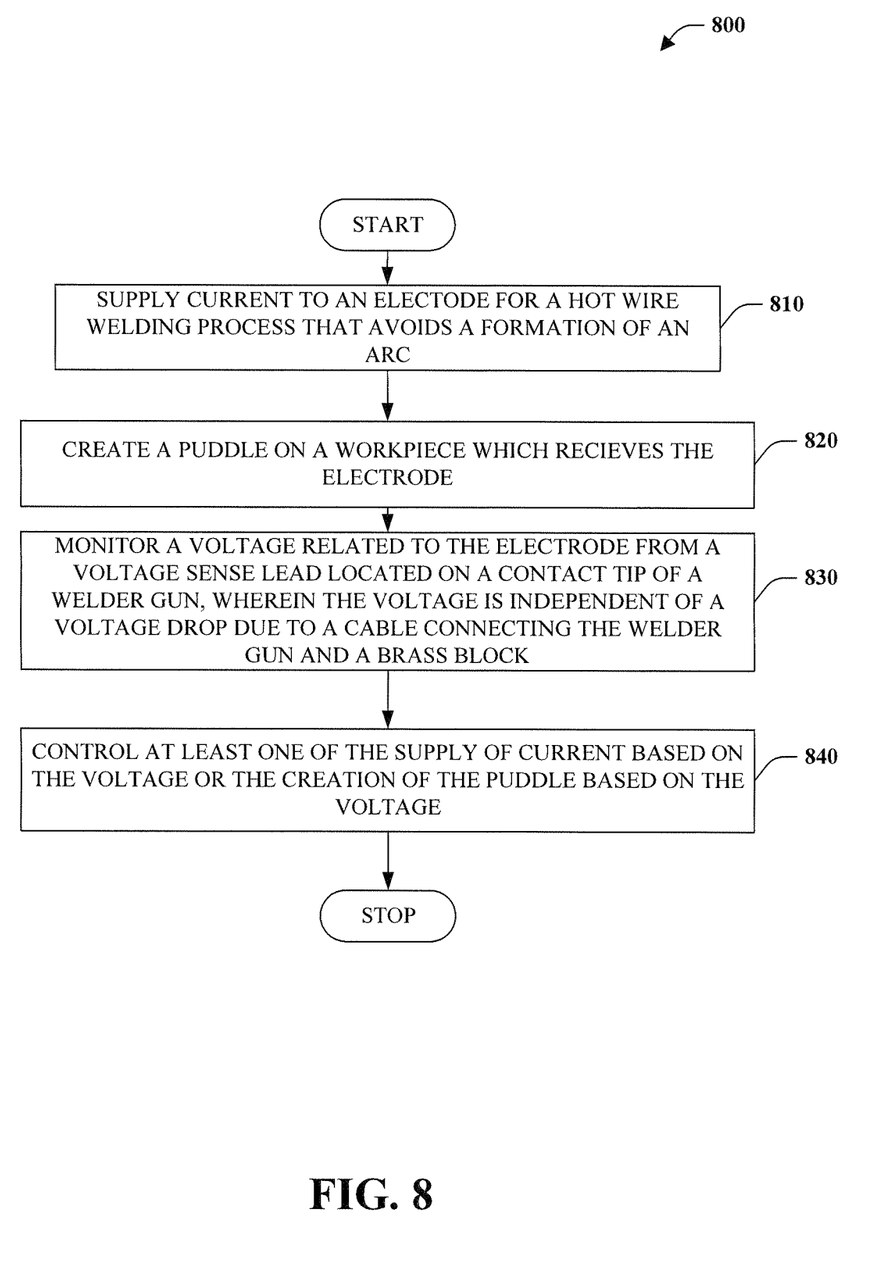
FIG. 8 is a flow diagram of controlling one or more welding parameters in a hot wire welding process based upon a voltage detected via a voltage sense lead.

In one embodiment, monitor component 130 is a computer operable to execute the disclosed methodologies and processes, including method 800 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with monitor component 130.

The monitor component 130 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within monitor component 130, such as during start-up, is stored in the ROM.

Monitor component 130 can further include a hard disk drive, a magnetic disk drive, e.g., to read from or write to a removable disk, and an optical disk drive, e.g., for reading a CD-ROM disk or to read from or write to other optical media. Monitor component 130 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by monitor component 130.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in monitor component 130 can be any of a number of commercially available operating systems.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., monitor component 130) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

Figure 2:
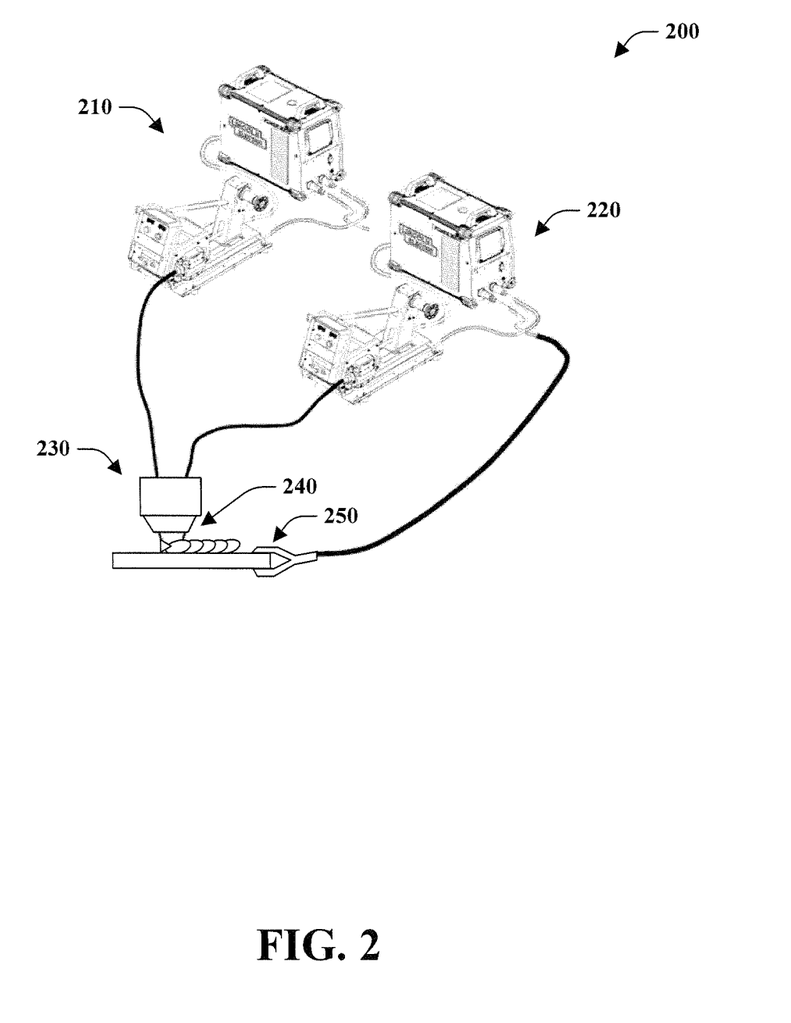
FIG. 2 is a diagram illustrating a hot wire welding system.

FIG. 2 illustrates a diagram of a hot wire welding system 200 in accordance with the subject innovation. System 200 includes a first power supply 210 that provides a first heat source to create a puddle on a workpiece. System 200 further includes hot wire system 220 that heats an electrode fed into a welder gun (e.g., tandem GMAW torch 230) while avoiding a formation of an arc. System 200 includes a voltage sense lead that senses voltage of the workpiece between two positions, wherein first position 240 is located on or within the welder gun (e.g., tandem GMAW torch 230) and second position 250 is on a clamp or connector to the workpiece.

Figure 3:
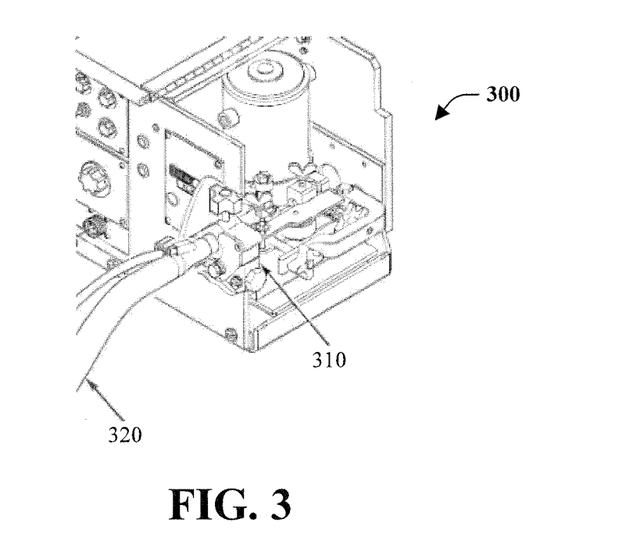
FIG. 3 is a diagram illustrating portion of a hot wire welding system.
Figure 4:
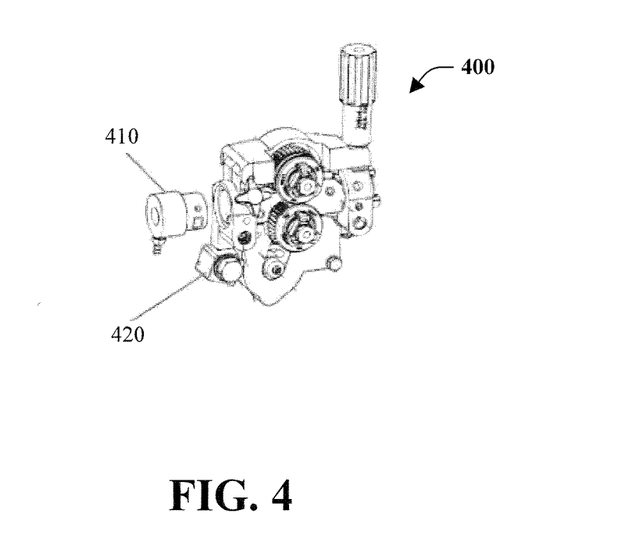
FIG. 4 is a diagram illustrating a portion of a hot wire welding system.

FIG. 3 illustrates a portion of hot wire system 300. Portion of hot wire system 300 includes conductor block 310 and gun cable assembly 320. As referenced herein, gun cable assembly 320 includes a cable and/or a length of the cable that interferes with voltage measurement with a hot wire welding system that includes a power supply for heating a puddle and a wire power supply for heating a wire. Conventional techniques measure voltage from a position on conductor block 310 which includes interference and/or voltage drop from gun cable assembly 320. Briefly turning to FIG. 4, portion of hot wire system 400 is illustrated. Portion of hot wire system 400 includes gun receiver bushing 410 and connector block 420.

Figure 5:
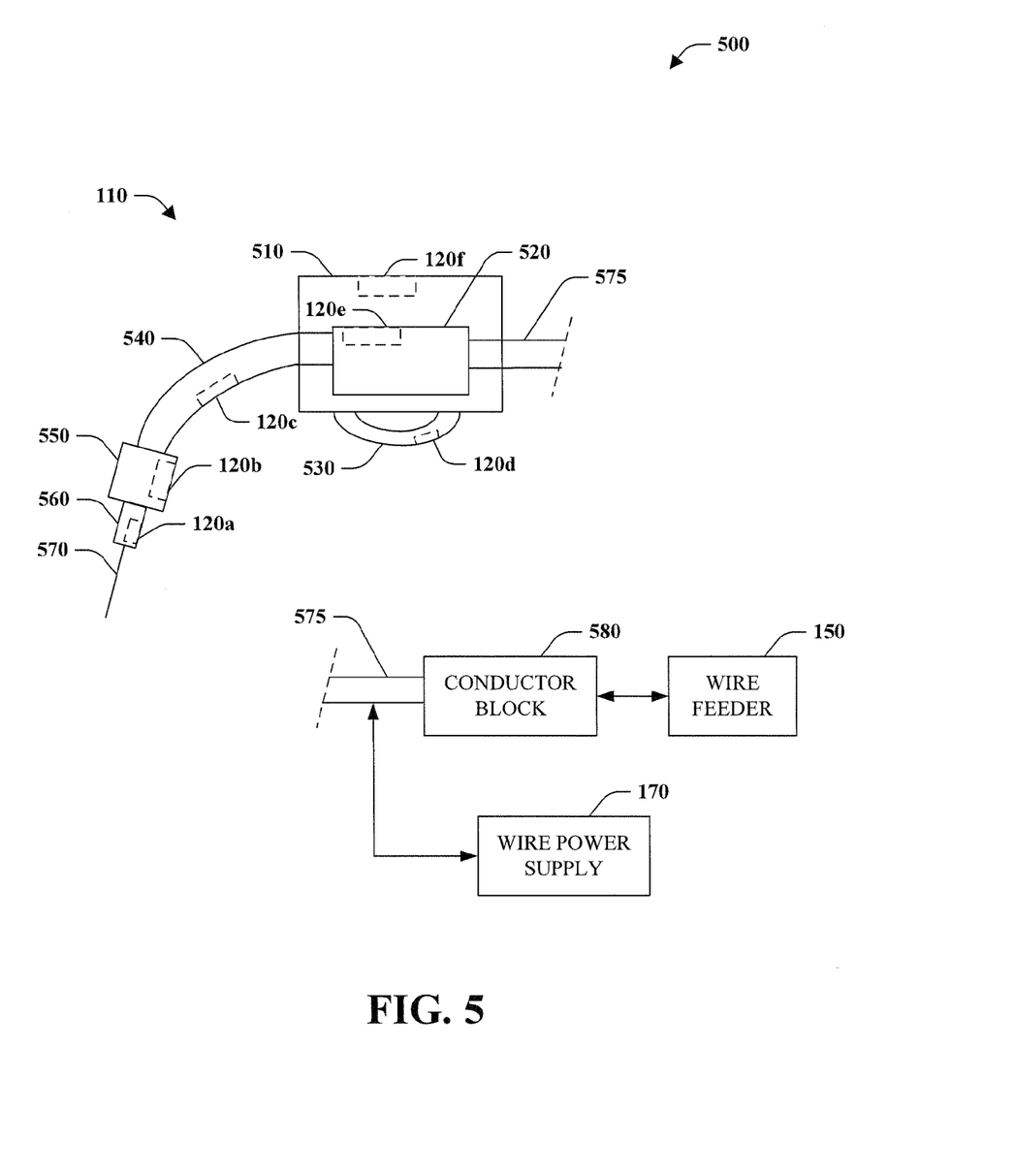
FIG. 5 is a block diagram illustrating a welder gun using a voltage sense lead for employment in a hot wire welding process.

FIG. 5 illustrates welder system 500 that includes welder gun 110 that uses voltage sense lead 120a, 120b, 120c, 120d, 120e, and/or 120f (collectively referred to as "voltage sense lead 120") for employment in a hot wire welding process. Welder gun 110 includes handle 510, mount 520, trigger 530 (e.g., it is to be appreciated that welder gun 110 can include trigger 530 or not include trigger 530 based on a semi-automatic welder gun or automatic welder gun), gooseneck 540, diffuser 550, contact tip 560, and/or electrode 570. Welder gun 110 further includes cable 575 that couples welder gun 110 to at least one of conductor block 580 or wire feeder 585. It is to be appreciated that conductor block 580 can be a component (e.g., brass component, component made of a suitable material, among others) to isolate components contained within wire feeder 585. Welder system 500 further includes wire power supply 170 that is electrically connected to cable 575 to supply power. It must be understood that this gun can be a multi-electrode based automatic torch for hot wire Tandem, GMAW where one wire is a conventional GMAW arc welding process and the other wire is a hot wire system where the wire is fed directly into the puddle and resistance heated with current passing between the tip and the puddle.

There can be one or more locations for the voltage sense lead shown as 120a, 120b, 120c, 120d, 120e, and/or 120f (collectively referred to as "voltage sense lead 120"), wherein the voltage sense lead can be positioned on or within a portion of welder gun 110. By way of example and not limitation, voltage sense lead 120a-120f are used to detect voltage associated with electrode 570. As referenced above, voltage sense leads 120 can be positioned on or within welder gun 110. It is to be appreciated that illustrating voltage sense lead 120 as being incorporated into a location of welder gun 110 is not to be limiting on the subject innovation and that voltage sense lead 120 can be positioned on one more locations of welder gun 110. Voltage sense lead 120 can be incorporated into welder gun 110, or disposed on a location of welder gun 110. For instance, voltage sense lead 120 can be incorporated into or disposed onto at least one of handle 510, mount 520, trigger 530, gooseneck 540, diffuser 550, or contact tip 560. Moreover, it is to be understood that the voltage sense lead 120 can be utilized with welder gun 110. As discussed above, monitor component 130 (illustrated in FIG. 1) utilizes the voltage sense lead to detect a voltage level for electrode 570 in which control or adjustment (via control component 140 illustrated in FIG. 1) of one or more welding parameters can be based.

In general, cable 575 is eliminated as a source for inaccurate readings, voltage drops, among others based on the location of voltage sense lead 120 being on or within welder gun 110. In an embodiment, voltage sense lead 120 can be incorporated into cable 575 in an isolated manner in order to eliminate such inaccuracies and/or voltage drops based on cable 575 (e.g., a length of cable 575). In particular, voltage sense lead 120 can be isolated with a plastic liner or a steel liner to mitigate interference from cable 575 (discussed in more detail in FIG. 6).

In an embodiment, a hot wire welding system includes a welder gun with two or more contact tips. In such embodiment, voltage sense lead 120 can be included on one or more contact tips in order to provide voltage readings. For example, if a welder gun includes two contact tips, voltage sense lead 120 can be within or on one contact tip or both contact tips.

Figure 6:
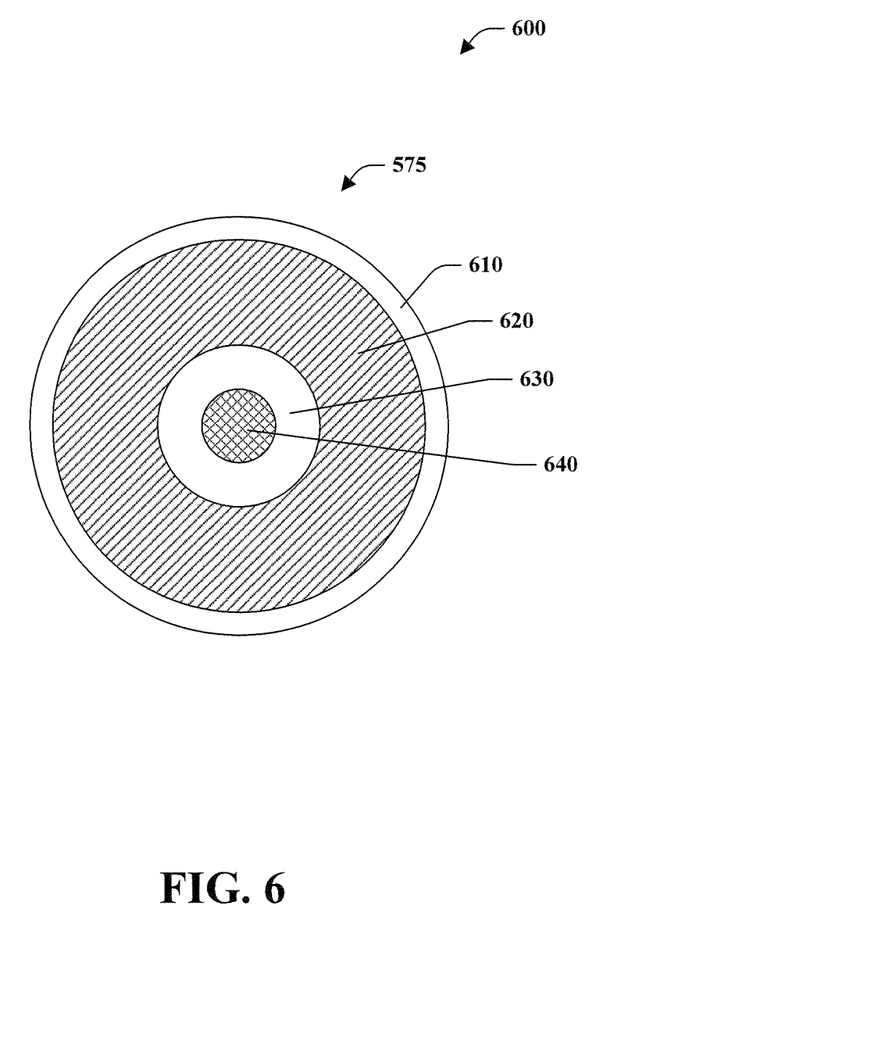
FIG. 6 is a block diagram illustrating a cross-sectional view of cable used with a voltage sense lead encapsulated therein for a welder gun.

FIG. 6 illustrates cross-sectional view 600 of cable 575 used with a voltage sense lead encapsulated therein for a welder gun. Cable 575 connects welder gun 110 to at least one of a conductor block or a wire feeder and often generates inaccuracies, voltage drops, or false readings for voltage of an electrode used in a hot wire welding process. Cross-sectional view 600 illustrates cable 575 with jacket 610, copper portion 620, gas line 630, and voltage sense lead 640. It is to be appreciated that voltage sense lead 640 and previously discussed voltage sense lead 120 provide voltage detection of an electrode or wire used in a hot wire welding process without interference from cable 575. Moreover, it is to be appreciated and understood that voltage sense lead 640 can be isolated with a suitable insulator such as, but not limited to, a plastic, a sleeve of an insulating material, among others. In particular, the isolation can be from copper portion 630.

Location of voltage sense lead 640 and/or voltage sense lead 640 having an insulated material provides isolation from interference or voltage drops from cable 575. It is to be appreciated that voltage sense lead 640 being encapsulated within gas line 630 allows independence from a voltage drop related to cable 575 and/or an interference from cable 575.

Figure 7:
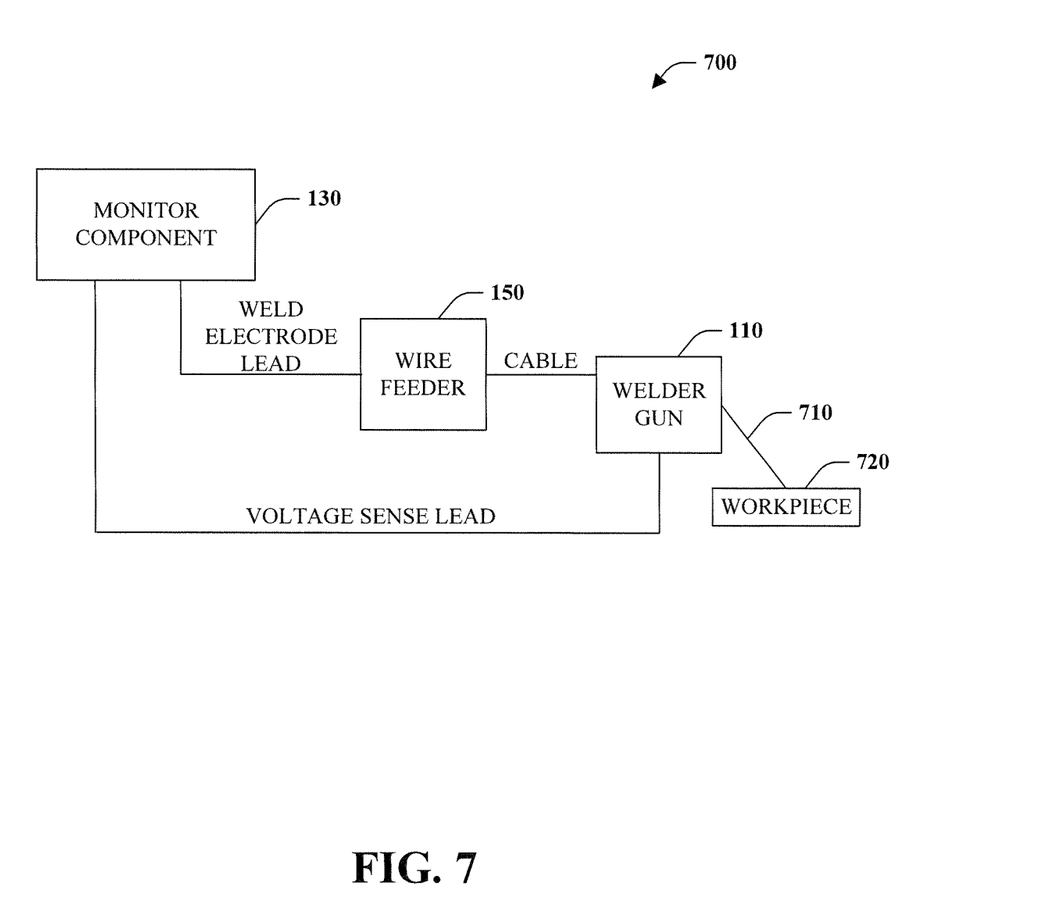
FIG. 7 is a block diagram illustrating a welder system that utilizes a voltage sense lead associated with a welder gun to eliminate a voltage drop from a cable that connects a wire feeder to the welder gun.

FIG. 7 illustrates welder system 700 that utilizes a voltage sense lead associated with a welder gun to eliminate a voltage drop from a cable that connects a wire feeder to the welder gun. System 700 includes monitor component 130 that detects a voltage for electrode 710 used with welder gun 110 on workpiece 720 in a hot wire welding process. For instance, wire feeder 150 can be connected to welder gun 110 by a cable and/or conductor. The voltage sense lead can be connected to welder gun 110 or incorporated within welder gun 110 in order to provide an unmolested voltage reading independent of interference or voltage drop from the connection between wire feeder 150 and welder gun 110.

Monitor component 130 utilizes the voltage sense lead and the voltage detected to identify a condition related to an arc. Control component 140 (referenced in FIG. 1) employs at least one of an increase in output of the wire power source, a decrease in output of the wire power source, or a non-change in output of the wire power source. Additionally, control component 140 adjusts a wire speed from a wire feeder that supplies the electrode, wherein the wire speed is at least one of increased, decreased, or maintained. Control component 140 adjusts a wire direction of a wire feeder that supplies the electrode.

Control component 140 adjusts an output of the power source based on the voltage detected from the voltage sense lead. Control component 140 employs at least one of an increase in output of the power source, a decrease in output of the power source, or a non-change in output of the power source. In an embodiment, the voltage sense lead can be located on at least one of a contact tip of the welder gun, a mount of the welder gun, a handle of the welder gun, a gooseneck of the welder gun, or a diffuser of the welder gun. In another example, the voltage sense lead is located within at least one of the mount, the handle, the gooseneck, of the diffuser.

In view of the exemplary devices and elements described supra, methodologies that may be implemented in accordance with the disclosed subject matter will be better appreciated with reference to the flow charts and/or methodology of FIG. 8. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 800 of FIG. 8 which is a flow diagram 800 that provides controlling of one or more welding parameters in a hot wire welding process based upon a voltage detected via a voltage sense lead. A current is supplied to an electrode for a hot wire welding process, wherein the hot wire welding process avoids a formation of an arc (reference block 810). A puddle is created on a workpiece which receives the electrode (reference block 820). A voltage related to the electrode is monitored from a voltage sense lead located on a contact tip of a welder gun, wherein the voltage is independent of a voltage drop due to a cable connecting the welder gun and a conductor block (reference block 830). Controlling at least one of the supplying based on the voltage or the creating based on the voltage (reference block 840).

In an embodiment, a method includes measuring voltage drop across electrode using a voltage sense lead on or within a welder gun used in a hot wire welding process. The method includes comparing the voltage drop to a predetermined range. If the voltage is within the predetermined range, the method can continue to monitor. If the voltage is below the predetermined range, the voltage of the power source can be increased. If the voltage is above the predetermined range, the voltage of the power source can be decreased. In another embodiment, the wire feed speed can be modified (e.g., increased or decreased to modify the temperature of the puddle (e.g., weld pool).

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
   a welder gun used for a hot wire welding process;
   a wire power supply that heats an electrode fed into the welder gun while avoiding a formation of an arc;
   a power supply that creates a puddle in which the puddle receives the electrode via the welder gun;
   a cable that connects the welder gun to a conductor block of the welder system, wherein the cable includes a gas line, a portion of copper surrounding the gas line, and an outer jacket surrounding the portion of copper;
   a voltage sense lead that is located within a jacket of the cable, wherein the voltage sense lead is insulated from the portion of copper within the jacket and connects to the welder gun; and
   an additional voltage sense lead that is located on the welder gun and is electrically connected to the voltage sense lead.

2. The welder system of claim 1, further comprising a monitor component that is configured to detect the voltage for the electrode at least one of the voltage sense lead that is located within a jacket of the cable and the additional voltage sense lead that is located on the welder gun.

3. The welder system of claim 1, wherein the monitor component utilizes the voltage sense lead and the voltage detected to identify a condition related to an arc.

4. The welder system of claim 1, further comprising a control component that is configured to adjust an output of the wire power source based on the voltage detected at least one of the voltage sense lead that is located within a jacket of the cable and the additional voltage sense lead that is located on the welder gun.

5. The welder system of claim 4, wherein the control component employs at least one of an increase in output of the wire power source, a decrease in output of the wire power source, or a non-change in output of the wire power source.

6. The welder system of claim 4, wherein the control component is further configured to adjust a wire speed from a wire feeder that supplies the electrode, wherein the wire speed is at least one of increased, decreased, or maintained.

7. The welder system of claim 4, wherein the control component is further configured to adjust a wire direction of a wire feeder that supplies the electrode.

8. The welder system of claim 4, wherein the control component is further configured to adjust an output of the power source based on the voltage detected from the voltage sense lead.

9. The welder system of claim 8, wherein the control component employs at least one of an increase in output of the power source, a decrease in output of the power source, or a non-change in output of the power source.

10. The welder system of claim 1, further comprising a monitor component that is configured to detect a voltage between the electrode and workpiece from the voltage sense lead without a voltage drop related to the cable.

11. The welder system of claim 10, wherein the voltage detected is used to prevent an arc within the hot wire welding process.

12. The welder system of claim 1, further comprising a control component that is configured to adjust at least one of an output of the wire power source based on the voltage detected from the voltage sense lead, an output of the power source based on the voltage detected from the voltage sense lead, a wire feed speed based on the voltage detected from the voltage sense lead, or a wire feed speed direction based on the voltage detected from the voltage sense lead.

13. The welder system of claim 1, wherein the additional voltage sense lead is located on at least one of a contact tip of the welder gun, a mount of the welder gun, a handle of the welder gun, a gooseneck of the welder gun, or a diffuser of the welder gun.

* * * * *